United States Patent Office 3,329,595
Patented July 4, 1967

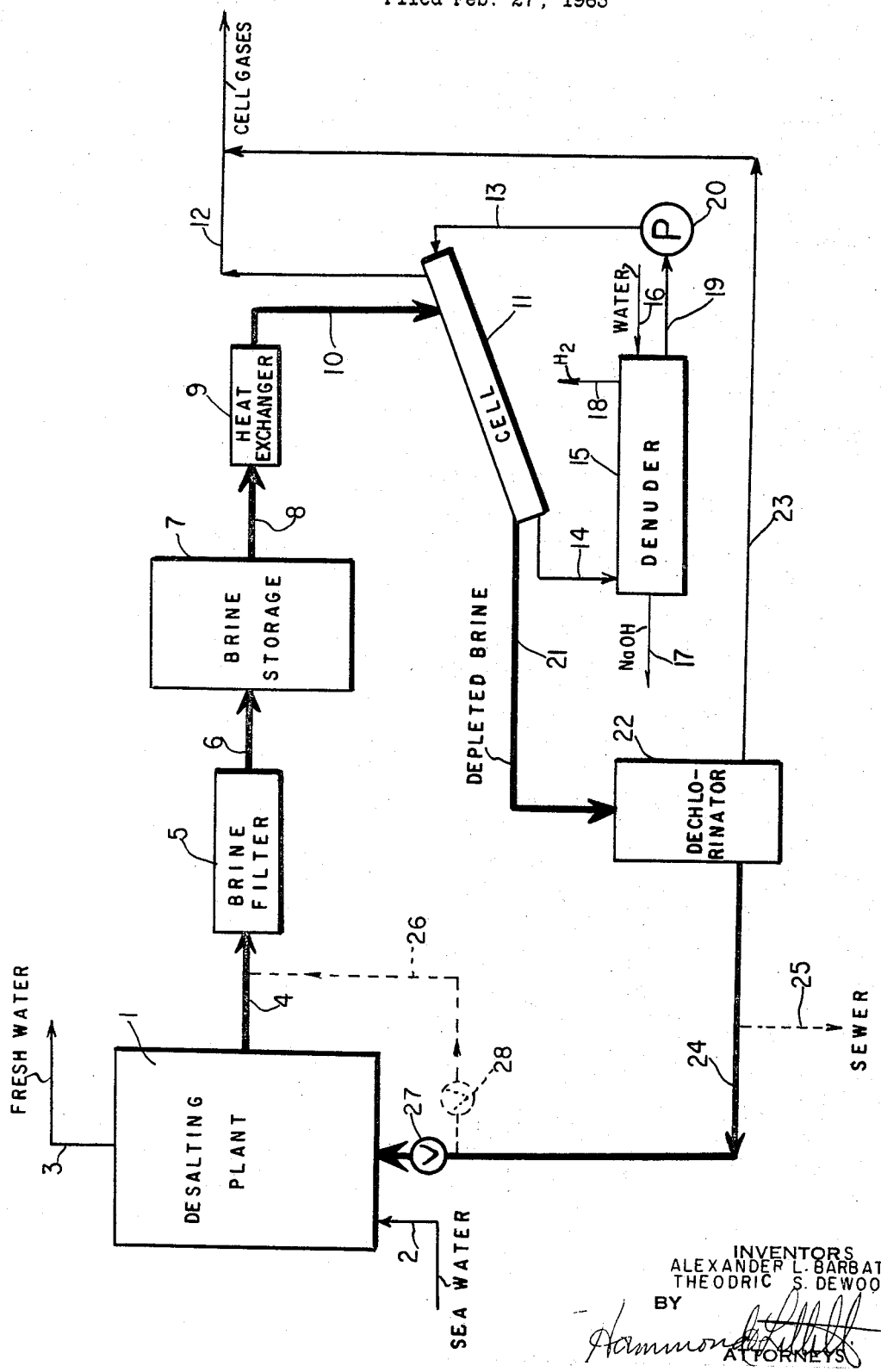

3,329,595
ELECTROLYSIS OF CONCENTRATED SEA WATER
Alexander Louis Barbato, Perry, and Theodric S. Dewoody, Painesville, Ohio, assignors to Diamond Alkali Company, Cleveland, Ohio, a corporation of Delaware
Filed Feb. 27, 1963, Ser. No. 261,390
13 Claims. (Cl. 204—99)

This invention relates to a process for producing chlorine and caustic soda from concentrated sea water or similarly constituted brines. The invention more particularly relates to a process for the production of chlorine and caustic soda by the electrolysis of concentrated sea water as produced in commercial desalting operations, in which process the electrolysis is conducted in an inclined plane mercury cathode electrolytic cell.

Chlorine and caustic soda are commonly commercially produced by the electrolysis of substantially saturated aqueous solutions of sodium chloride usually made by dissolving solid natural sodium chloride (rock salt) in water and purifying the resulting brine, particularly with respect to calcium and magnesium. The brine concentration normally used is approximately 300 grams of NaCl per liter (g.p.l.), (equivalent to chloride ion concentration of approximately 182 g.p.l.).

The electrolysis of such solutions has been carried out commercially, as is well known in the art, in various types of electrolytic cells including the general types known as horizontal and vertical mercury cathode cells, which are described by Sommers in "Chemical Engineering Progress," September 1957, volume 53, No. 9, pages 409 to 417. Although there are a variety of specific types of electrolytic mercury cathode cells known for the electrolysis of a substantially saturated sodium chloride solution, all of these electrolytic cells require a relatively pure sodium chloride feed brine with a sodium chloride concentration within the range of 280 to 310 g.p.l. (equivalent to a chloride ion concentration of 170–188 g.p.l.) for satisfactory commercial operation.

A large naturally occurring source of sodium chloride solution is available in the form of sea water, but natural sea water is far too dilute in its chloride ion concentration to be used in commercial electrolysis processes, and moreover contains a relatively large proportion of impurities, especially calcium and magnesium, which give rise to hydrogen evolution and low current efficiencies during electrolysis in a mercury cathode cell. For this reason, no practical commercial electrolytic process has yet been devised for obtaining chlorine and caustic soda from sea water.

Various processes are now in use for desalting sea water to produce purified potable or industrial waters therefrom, and in all of these desalting processes a sodium chloride brine which has been concentrated to the equivalent of at least about 5 times the chloride content of natural sea water may be produced as a by-product, or an increase in the chloride ion concentration from approximately 19 g.p.l. of normal sea water to at least 95 g.p.l.

In this regard, for the composition of natural sea water, see for example, "The Oceans—Their Physics, Chemistry and General Biology," Sverdrup, Johnson and Fleming © Prentice-Hall, 1942; Table of Dittmar's Averages, at page 166, reproduced in part hereinbelow:

| 1940 Values: | $Cl=°/_{oo}$ (gms./1000 gms. soln.) |
|---|---|
| $Cl^-$ | 18.980 |
| $Br^-$ | 0.065 |
| $SO_4^=$ | 2.649 |
| $Mg^{++}$ | 1.272 |
| $Ca^{++}$ | 0.400 |
| $K^+$ | 0.380 |
| $Na^+$ | 10.556 |

We have found that the concentrated sea water brine from such desalting operations, and other similarly constituted natural or synthetic sodium chloride containing brines, or mixtures of such brines, can be electrolyzed in a mercury cathode cell to produce chlorine and caustic soda by the processes herein described in spite of its high content of impurities, especially calcium and magnesium which give rise to relatively high concentrations of hydrogen in the gases evolved during electrolysis.

It is therefore an object of this invention to provide a process for obtaining chlorine and caustic from concentrated sea water, and other similarly constituted sodium chloride-containing brines, whether natural or synthetic.

It is a further object of this invention to provide a method for electrolyzing concentrated sea water in a mercury cathode cell without encountering commercially prohibitive hydrogen concentrations in the evolved cell gases.

A further object is to provide a method for electrolyzing concentrated sea water having a relatively high proportion of impurities therein, while obtaining a high current efficiency for the mercury cathode electrolytic cell.

These and other objects of our invention will be readily apparent as the description thereof proceeds.

In the process of our invention, a variation in the operation of the conventional horizontal mercury cathode cell is used for the electrolysis of concentrated sea water. In the conventional horizontal mercury cell as shown and described, for example, in U.S. Patent No. 2,544,138, mercury or mercury amalgam flows over the cell base from end to end of the cell forming a flowing mercury cathode. The anodes, usually of graphite, are suspended above the flowing mercury cathode, the electrolyte occupies the space between the anode and cathode surfaces, and electrolysis of the electrolyte takes place in the gap formed between the anode and the cathode surfaces. In normal use, the base of the cell, supporting the flowing mercury cathode and over which the mercury cathode flows, is inclined just sufficiently to cause the mercury to flow by gravity from one end of the cell base to the other. The degree of inclination is usually about 0.25° and always less than 0.5°

In co-pending application, Ser. No. 234,454, filed Oct. 31, 1962, and now abandoned, it is disclosed that brine solutions may be more effectively and efficiently electrolyzed in a cell of the type described above when the cell base is abnormally inclined at an angle of about 2° to about 85° below the horizontal, in terms of the level of introduction of mercury to the electrolysis section of the cell chamber and the level of removal of mercury therefrom, so that the mercury cathode flows downwardly more rapidly over the base. We have found that this abnormally inclined plane mercury cell may be used under the proper conditions for the electrolysis of concentrated sea water or similarly constituted sodium chloride-containing brines. Cells of the type described in said application have a high tolerance for impurities, especially calcium and magnesium, and will operate satisfactorily on concentrated sea water from which none of the soluble impurities has been removed. The feed for this process is suitably sea water which has been concentrated about 5 to 8 times or more, i.e., equivalent to about 95 to 152 grams or more of chloride ion per liter of solution, in order generally to be satisfactorily for commercial operation. Such a feed is usually available as an effluent from a sea water desalting plant for producing fresh water suitable for drinking and industrial purposes from natural sea water.

In said co-pending application, above referred to, it is disclosed that an inclined plane mercury cell has a tolerance for impurities well above the levels encountered in commercial operations without loss of current efficiency and without excessive hydrogen evolution in the cell. However, the impurity levels of sea water concentrated to at least 5 times are considerably higher, and the chloride ion concentrations lower than, those found to be tolerable for commercial inclined plane mercury cell operation at ordinary operating conditions of temperature, brine depletion and current densities. The inclined plane mercury cell is generally operated at temperatures of above 150° F. and up to the boiling point of the brine, with a cathode current density of 5.0 a.s.i. (amperes per square inch), a feed brine concentration of around 182 g.p.l. chloride ion, and a brine depletion of approximately 36 g.p.l. chloride ion.

An important variable allowing successful electrolysis of concentrated sea water in an inclined plane mercury cathode cell has been found to be the operating temperature of the cell. When the operating temperature is reduced from the normal level (above 150° F.) to 120° F., satisfactory cell operation from a commercial standpoint is obtained. It will be recognized by those skilled in the art that operating the inclined plane mercury cathode cell at a lower temperature and a reduced NaCl content in the brine feed, a higher voltage is to be expected. For example, the normal operation of a horizontal mercury cathode cell as described above would ordinarily require 4.45 volts with purified saturated NaCl brine, and when using concentrated sea water as the electrolyte of an inclined plane mercury cell and operating at 120° F., 5.1 volts are ordinarily required. This represents the voltage rise due to the lower electrolyte concentration and lower cell temperature.

When concentrated sea water is electrolyzed in an inclined plane mercury cathode cell at cell temperatures above 130° F., the hydrogen evolution is two to three times greater than when the electrolysis is carried out at a cell temperature of about 120° F. Cell temperatures above about 130° F. may be used if desired, if care is taken to protect against explosive concentrations of hydrogen occurring in the cell gas particularly during subsequent processing steps.

Very satisfactory operation, from a commercial standpoint, is obtained when operating the inclined plane mercury cathode cell under the following conditions:

(1) Cell temperature _____ Below about 130° F., preferably at about 120° F.
(2) Cell inclination _____ 2°–85°, preferably between 5° and 30°.
(3) Cl⁻ concentration in concentrated sea water feed _ 95 g.p.l. or greater.
(4) Cl⁻ in depleted brine effluent _____ Preferably not less than 90 g.p.l.

Using the above conditions, the inclined plane mercury cell will ordinarily give the following results:

(1) Cathode current efficiency, percent _____ 93–95
(2) Cell voltage (5.0 a.s.i. cathode current density), volts _____ 5.10
(3) $H_2$ content in cell gas (exclusive of atmospheric gases), percent by vol. _____ 2–2.5

These conditions and results are applicable generally to an inclined plane mercury cathode cell wherein the anodes are fashioned from extruded graphitized carbon, as representative of a presently commercially standard material for anode construction. However, as might be expected, the use of less massive metallic anodes, for example platinized titanium anodes, or other less massive electrically conductive, material for the anodes, is possible and may be equally suitable, if not more so, in the process of the present invention depending upon the design of such anodes, and the cell generally, to allow for optimum circulation of electrolyte and cell gases within the cell.

The general process of the present invention may be seen from the drawing attached hereto and made a part hereof, which represents a flow diagram of the complete process, including the steps and equipment before and after the cell.

In the drawing, a desalting plant 1 receives sea water from line 2. The sea water may suitably be desalted or concentrated to the desired extent by evaporation and distillation including flash evaporation, and vapor compression, or by electrodialysis, chemical separation, or other known methods to provide a fresh water effluent which is withdrawn from line 3, and a residue constituting concentrated sea water which is withdrawn through line 4.

The concentrated sea water brine may be passed through brine filter 5 to remove suspended solids and then through line 6 to brine storage 7. From this point, the brine passes through line 8 to heat exchanger 9 where the temperature may be adjusted prior to passage of the brine through line 10 to the inclined plane mercury cell 11.

The cell 11 is suitably constructed in accordance with the principles of operation, design, and construction, described in application Ser. No. 234,379, filed Oct. 31, 1962. In cell 11, the concentrated sea water brine is electrolyzed to produce chlorine which leaves the cell through line 12. The mercury which enters the cell through line 13 and forms the cell cathode, amalgamates with sodium in the cell and the amalgam is withdrawn from the lower end of the cell through line 14 and passes to a denuder 15.

In denuder 15, the amalgam comes into contact with fresh water fed through line 16 to produce caustic soda and hydrogen, which are withdrawn through lines 17 and 18, respectively. The amalgam is reduced to mercury and is recycled by means of line 19 and pump 20 through line 13 and back into cell 11.

The depleted brine in cell 11 is withdrawn from the cell by means of a line 21 to a dechlorinator 22 wherein chlorine is separated from the depleted brine and is passed to line 12 by way of line 23. The dechlorinated brine leaves the dechlorinator through line 24 and may be returned to desalting plant 1 to raise the concentration of the brine again, or all, or any portion of the brine, may be discharged to waste through the line 25 if desired. Also, as illustrated by the broken line 26, if dechlorinated depleted brine is recycled in the process a side stream of the depleted brine may be added directly to the concentrated brine from the desalting plant 1, in the ratio desired, to maintain a substantially constant brine composition flowing through the electrolysis plant, by manipulation of valves 27 and 28.

The chlorine in the cell gases may be dried and compressed or further processed for shipment and use in the usual way, or it may be added, without further processing, to the potable water stream 3, if the water from the desalting plant is to be mixed with other water supplies which require chlorination.

This description represents one embodiment of our invention and it will be understood that various changes may be made in the process and the invention is not limited to the specific embodiment described.

The following specific examples are presented to further illustrate the principles of the invention in some detail to persons skilled in the art, although it will be further understood that the invention is not intended to be limited to the precise operating conditions recited in the examples.

In each of the examples operation of the inclined plane mercury cathode cell, or the horizontal mercury cathode cell is initiated using purified saturated NaCl brine to establish stabilized operating conditions and a base point of comparative performance, such operation on purified NaCl brine being continued generally for a period of 2-3 hours, in order to reach equilibrium conditions before the brine feed is switched to synthetically constituted concentrated sea water.

The length of time constituting a satisfactory run on the synthetically constituted concentrated sea water is from 4 to 10 hours for the data obtained for the examples, depending upon brine supplies, upset conditions externally of the cell, etc. Samples of gas and amalgam are taken periodically to establish hydrogen content and cathode current efficiency data. The effects of the angle of inclination of the cell, the operating temperature of the cell, amalgam flow rate, current density, and brine depletion, investigated are, except where otherwise indicated, for a synthetically constituted concentrated sea water feed brine having a chloride ion concentration of 95–137 g.p.l. Higher concentrations of sea water could of course be used if such higher concentrations are available from the desalting plant since such higher concentrations would give even better cell performance.

The synthetically constituted concentrated sea water brine used for this investigation is prepared from a standard, commercially available, synthetic salt mixture to produce a simulated concentrated sea water containing those elements found in natural sea water in quantities greater than 0.004%. The salt mixture used to produce the simulated concentrated sea water has the following elemental composition according to the seller's label:

|  | Percent |
|---|---|
| Sodium | 30.577 |
| Magnesium | 3.725 |
| Calcium | 1.178 |
| Potassium | 1.099 |
| Strontium | 0.0382 |
| Boron | 0.0135 |
| Chloride | 55.035 |
| Sulphate | 7.692 |
| Bromide | 0.1868 |
| Bicarbonate | 0.405 |
| Fluoride | 0.0039 |

Concentrated sea water feed brines for electrolysis experiments are made by adding various quantities of this salt to ordinary tap water. A typical analysis of the brine so made is shown below:

|  | Feed brine (g.p.l.) |
|---|---|
| $Cl^-$ | 127–137 |
| $Na^+$ | 71–79 |
| $Ca^{++}$ | 1.0 |
| $Mg^{++}$ | 4.88 |
| $SO_4^=$ | 9.20 |
| Fe | .00005 |

SPECTROGRAPHIC ANALYSIS OF FEED BRINE
(GM./100 GM. NaCl)

|  |  |
|---|---|
| $SiO_2$ | <.004 |
| $Al_2O_3$ | <.0012 |
| Cu | <.00012 |
| Mn | <0.00004 |
| Ni | <.00012 |
| Sr | .013 |
| CaO | .72 |
| MgO | 3.42 |
| Pb | <.00005 |

The sodium ion concentration of the feed brine noted above is equivalent to approximately 180–200 gm. NaCl per liter.

*Example 1*

Experimental results showing the effects of temperature on cell performance are shown below, utilizing the synthetically constituted concentrated sea water brine as noted above.

The cell operating conditions are:

(1) Cell inclination angle (below horizontal) _____ 30°.
(2) Cathode current density _____ 2.5 a.s.i.
(3) Mercury flow _____ 3,000 mls./min./ft. of cell width.
(4) Feed brine concentration _____ 132 g.p.l. chloride ion.
(5) Brine depletion (chloride ion) __ 18 g.p.l.

Varying the cell temperature under the above conditions gives the following results:

| Cell Temperature, °F. | Hydrogen Content of Cell Gas Percent by Vol. | Cathode Current Efficiency, Percent |
|---|---|---|
| 120 | 2.3 | 93–95 |
| 130 | 4.0 | 89–91 |
| 140 | 5.4 | 87–88 |

*Example 2*

In this example variations are made in the angle of inclination of the cell and cathode current density. The cell operating conditions are fixed at:

(1) Cell temperature _____ 120° F.
(2) Mercury flow _____ 3000 mls./min./ft. of cell width.
(3) Feed brine type _____ Synthetically constituted concentrated sea water.
(4) Feed brine concentration _____ 130 g.p.l. chloride ion.
(5) Brine depletion (chloride ion) ___ 18 g.p.l.

| Cathode Current Density (a.s.i.) | Cell Inclination (° Below Horizontal) | Average $H_2$ Content of Cell Gas (Percent by Volume) | Range of Cathode Current Efficiencies (Percent) |
|---|---|---|---|
| 2.5 | 5 | 2.8 | 93–95 |
| 5.0 | 5 | 2.4 | 92–94 |
| 2.5 | 30 | 2.4 | 92–95 |
| 5.0 | 30 | 2.3 | 92–94 |

From the above data, it may be seen that between 5° and 30° inclination, changes of cell angle and cathode current density have little, if any effect.

*Example 3*

A run is made with synthetically constituted concentrated sea water having a chloride ion concentration of 96 gms./liter, the electrolysis being carried out at a cathode current density of 2.5 a.s.i., a cell temperature of 115° F., and a cell inclination of 30° (below horizontal) in order to show the effects to be obtained by the use of a more dilute feed brine, and relatively high brine depletion values. At brine depletions of 18 g.p.l. chloride ion high hydrogen evolution is experienced and considerable attack is visible on the graphite anodes, further evidenced by a large number of graphite particles in the depleted brine. When the brine depletion is changed from 18 g.p.l. chloride ion to 6 g.p.l., the $H_2$ content of the cell gas is reduced from approximately 7–8% by volume, to 4% by volume, and the depleted brine is cleared of graphite particles. It is further observed that with a sea water concentration of 96 g.p.l. chloride ion the electrolysis could be performed satisfactorily for commercial operation as long as the brine depletion is not substantially greater than 6 g.p.l. chloride ion. In this case, the hydrogen evolution is not greater than 4.0% by volume.

Examples 4 and 5 are provided for comparison of results obtained when wide variations are made in the angle of inclination of the cell when using a purified saturated sodium chloride brine solution as normally provided in commercial electrolytic chlorine-caustic production.

*Example 4*

OPERATING CONDITIONS (1) Cell inclination _____ 30°.
(2) Cathode current density ____ 5.0 a.s.i.
(3) Brine depletion (chloride ion) _____ 36 g.p.l.
(4) Brine type _____ Purified NaCl brine.
(5) Cell temperature _____ 160°±5° F.
(6) Mercury flow rate _____ 3000 mls./min./ft. of cathode width.
(7) Na in amalgam _____ 0.15%.
(8) Anodes _____ Graphite blocks with ½″ slots cut on one inch centers.
(9) Length of run after equilibrium conditions reached _____ 5½ hours.
(10) Electrolyte gap _____ 0.094″.

The current efficiency during the run was 96.1%, the cell voltage was 4.39 volts, the power consumption was 3,133 kwh./ton $Cl_2$ and the hydrogen evolved was 0.4% by volume, of the cell gas exclusive of atmospheric gases.

*Example 5*

OPERATING CONDITIONS (1) Cell inclination _____ 0.25°.
(2) Cathode current density ____ 5.0 a.s.i.
(3) Brine depletion (chloride ion) _____ 36 g.p.l.
(4) Brine type _____ Purified brine.
(5) Cell temperature _____ 160°±5° F.
(6) Mercury flow rate _____ 3000 mls./min./ft. width of cathode.
(7) Anode _____ Graphite blocks with ½″ slots cut on one inch centers.
(8) Length of run after equilibrium conditions reached _____ 4 hours.
(9) Electrolyte gap _____ 0.140″.

The current efficiency during the run is found to be 96.3%, the cell voltage 4.68 volts, the power consumption 3,333 kwh./ton $Cl_2$ and the hydrogen evolved is 0.35% by volume of the cell gas exclusive of atmospheric gases.

*Example 6*

The effect of brine concentrations on the performance of a horizontal mercury cathode cell is evident from the table of data below, which data are taken over a period of 3 hours under the constant conditions of a cathode current density of 2.9 a.s.i., an operating temperature of 150°–152° F., and an angle of inclination of 1° below the horizontal, the controllable operating variable being the chloride ion concentration of the purified sodium chloride feed brine.

| Chloride ion concentration (g.p.l.): | $H_2$ content of cell gases (Percent by volume) |
|---|---|
| 185 | 0.77 |
| 133 | 1.6 |
| 109 | 1.0 |
| 76 | 11.0 |
| 53 | 9.0 |

*Example 7*

PART A

Another comparison of the effect of brine contaminants and cell operating temperatures in a horizontal mercury cell is observed by initially operating such a cell on substantially saturated purified sodium chloride brine ($Cl^-$ concentration 185 g.p.l.), at a temperature of 150° F., and a cathode current density of 2.9 a.s.i., under which conditions the hydrogen content of the evolved cell gases is found to be 1% by volume. Continuing these same conditions but contaminating the feed brine with 23 p.p.m. of Mg (added as $MgCl_2$), which is a very conservative initial step toward similating concentrated sea water, immediately increases the hydrogen content of the evolved cell gases to 11.6% by volume and subsequently to as high as 14.6% by volume. Continuing the contaminated brine feed under the above conditions the hydrogen content of the evolved cell gases rises to as high as 21% by volume, even when the cell temperature is lowered to 120° F.

PART B

Operation of the horizontal mercury cathode cell is continued but using synthetically constituted concentrated sea water having a chloride ion concentration which varies between 127 and 137 g.p.l., while maintaining the cell temperature within the range of 118°–120° F., and the cathode current density at 2.9 a.s.i. A steady state condition of operation of the cell is not attainable. A sample of the evolved cell gases obtained under the above conditions showed the gases to contain about 22% of hydrogen by volume exclusive of atmospheric gases, while at the same time solid particles having the characteristic appearance of calomel are observed on the surface of the effluent amalgam and are sufficient volume to cause subsequent blocking of effluent lines.

While we have set forth specific examples of preferred embodiments of our process, it will be understood that the invention is not limited thereto and that various changes and modifications may be made without departing from the spirit of this invention, or the scope of the appended claims.

What is claimed is:

1. A process for the electrolysis of concentrated sea water containing all the soluble materials naturally found in sea water which comprises passing said concentrated sea water through an inclined plane mercury cathode electrolytic cell having the cathode-supporting base inclined at least 5° below the horizontal, at a cell operating temperature not greater than approximately 140° F.

2. A process for the electrolysis of concentrated sea water containing all the soluble materials naturally found in sea water which comprises feeding a concentrated sea water brine, having at least five times the chloride ion concentration of natural sea water, to a mercury cathode electrolytic cell having a cathode-supporting base inclined from at least 5° to 85° below the horizontal, maintaining the cell operating temperature not greater than 130° F., electrolyzing said brine so that the depleted brine effluent from said cell contains not less than 90 g.p.l. chloride ion.

3. A process for the electrolysis of concentrated sea water containing all the soluble materials naturally found in sea water to produce chlorine which comprises feeding a concentrated sea water brine having a chloride ion concentration of at least 95 g.p.l., and containing all of the other soluble impurities in the natural sea water to a mercury cathode electrolytic cell having a cathode-supporting base inclined from about 5° to 85° below the horizontal, flowing mercury as the cathode over said base, maintaining the cell operating temperature not greater than 130° F., electrolyzing said brine in said cell so that the depleted brine contains not less than 90 g.p.l. chloride ion, withdrawing chlorine from said cell, and withdrawing sodium amalgam from said cell.

4. A process for the electrolysis of concentrated sea water containing all the soluble materials naturally found in sea water to produce chlorine and caustic soda which comprises feeding a concentrated sea water brine having chloride ion concentration of at least 95 g.p.l. and containing all of the other soluble impurities in the natural sea water to a mercury cathode electrolytic cell having a cathode supporting base inclined from at least 5° to 85° from the horizontal, feeding mercury to said cell so as to flow over said base, maintaining the cell operating temperature not greater than 130° F., electrolyzing said brine so that the depleted brine effluent from said cell contains not less than 90 g.p.l. chloride ion, withdrawing chlorine from said cell, withdrawing sodium amalgam from said cell, and treating said amalgam in a decomposer to obtain caustic soda.

5. A process for the electrolysis of concentrated sea water containing all the soluble materials naturally found in sea water to produce chlorine and caustic soda which comprises feeding a concentrated sea water brine having at least 95 g.p.l. chloride ion and containing all of the other soluble impurities in the natural sea water to a mercury cathode electrolytic cell having a cathode supporting base inclined at an angle from at least 5° to 85° from the horizontal, feeding mercury to said cell so as to flow over said base, maintaining the operating temperature of said cell not greater than 130° F., electrolyzing said brine so that the effluent brine contains not less than 90 g.p.l. chloride ion, withdrawing chlorine from said cell, withdrawing sodium amalgam from said cell, and treating said amalgam in a decomposer to obtain caustic soda.

6. A process for the electrolysis of concentrated sea water containing all the soluble materials naturally found in sea water to produce chlorine and caustic soda which comprises feeding a concentrated sea water brine containing from about 90 to 140 g.p.l. chloride ion to a mercury cathode electrolytic cell having a cathode-supporting base inclined from at least 5° to 30° below the horizontal, feeding mercury to said cell so as to flow downwardly over said base and form sodium amalgam, maintaining said cell operating temperature not greater than about 130° F., electrolyzing said brine so that the depleted brine contains not less than 90 g.p.l. chloride ion, withdrawing chlorine from said cell, withdrawing sodium amalgam from said cell, and treating said amalgam in a decomposer to obtain caustic soda.

7. A process for the electrolysis of concentrated sea water containing all the soluble materials naturally found in sea water to produce chlorine and caustic soda which comprises feeding a concentrated sea water brine having chloride ion concentration from at least 90 to 140 g.p.l. to a mercury cathode electrolytic cell having a cathode-supporting base inclined from at least 5° to 85° from the horizontal, feeding mercury to said cell so as to flow over said base and form sodium amalgam, maintaining the operating temperature of said cell not greater than about 120° F., electrolyzing said brine so that the depleted brine effluent contains not less than 85 g.p.l. chloride ion, withdrawing chlorine from said cell, withdrawing sodium amalgam from said cell, and treating said amalgam in a decomposer to obtain caustic soda.

8. A process for the electrolysis of concentration sea water containing all the soluble materials naturally found in sea water to produce chlorine and caustic soda which comprises feeding a concentrated sea water brine having at least 90 g.p.l. of chloride ion to a mercury electrolytic cell having a cathode-supporting base inclined from at least 5° to 30° below the horizontal, feeding mercury to said cell so as to flow over said base, maintaining cell operating temperature not greater than about 120° F., electrolyzing said brine in said cell so that the chloride ion depletion is not greater than 18 g.p.l., withdrawing chlorine from said cell, withdrawing sodium amalgam from said cell, and treating said amalgam in a decomposer to obtain caustic soda.

9. A process for producing potable water, chlorine and caustic soda from natural sea water which comprises separating potable water from sea water in amount sufficient to produce concentrated sea water having at least 5 times the chloride ion content of natural sea water, feeding said concentrated sea water to a mercury cathode electrolytic cell having a cathode-supporting base inclined between about 5° and 85° below the horizontal, feeding mercury to said cell so as to flow over said base, maintaining the cell operating temperature below 140° F., electrolyzing said concentrated sea water in said cell to produce chlorine and a sodium-mercury amalgam, and decomposing said amalgam to produce caustic soda and regenerate said mercury.

10. A process for producing chlorine and caustic soda from sea water which comprises concentrating the soluble salt content of natural sea water to at least approximately 5 fold by removing water from the sea water, passing the concentrated sea water as the electrolyte through an inclined plane flowing mercury cathode electrolytic cell inclined at an angle substantially within the range of about 5° to 85° below the horizontal, maintaining electrolyzing conditions in said cell which produce chlorine at the anode and deposit sodium in the flowing mercury cathode, maintaining the cell operating temperature below 140° F., recovering the chlorine and converting the sodium in the cathode to sodium hydroxide.

11. A process for producing chlorine and caustic soda from sea water which comprises concentrating the soluble salt content of natural sea water at least 5 fold by removing water from the sea water, passing the resulting solutino as the electrolyte through an inclined plane flowing mercury cathode electrolytic cell inclined at an angle of about 5° to 30° from the horizontal, maintaining electrolyzing conditions in said cell which produce chlorine at the anode and deposit sodium in the flowing mercury cathode, maintaining the cell operating temperature below about 140° F., recovering the chlorine, converting the sodium in the cathode to sodium hydroxide, and returning the depleted electrolyte to the concentration step for further concentration.

12. A process for producing chlorine and caustic soda from an aqueous solution containing sodium ions and chloride ions and being selected from the group consisting of concentrated of concentrated natural sea water wherein the soluble salt content is at least approximately 5 times that of natural sea water and natural and synthetically similarly constituted brines, and mixtures thereof passing said solution selected from said group as the electrolyte through an inclined plane flowing mercury cathode electrolytic cell having a mercury cathode-supporting base inclined at an angle substantially within the range of about 5° to 85°, flowing mercury over said base, maintaining electrolyzing conditions within said cell to produce chlorine at the anode and deposit sodium in the flowing mercury cathode, maintaining the cell operating temperature below 140° F., recovering the chlorine, and converting the sodium in the cathode to sodium hydroxide.

13. A process for the electrolysis of an aqueous solution containing sodium ions and chloride ions and being selected from the group consisting of concentrated natural sea water, similarly constituted natural and synthetic brines, and mixtures thereof, and having a chloride ion concentration in excess of about 90 g.p.l., passing a solution selected from said group through an inclined plane mercury cathode electrolytic cell having a cathode-supporting base inclined at least 5° below the horizontal and at a cell operating temperature not greater than approximately 130° F., electrolyzing said solution in said cell so that the depleted brine effluent from said cell contains not less than approximately 90 g.p.l. chloride ion.

References Cited

UNITED STATES PATENTS

| | | | |
|---|---|---|---|
| 612,009 | 10/1898 | Baldo | 204—128 |
| 105,739 | 11/1938 | Lundberg | 204—99 |
| 2,688,594 | 9/1954 | Oosterman | 204—119 |
| 2,704,743 | 3/1955 | Deprez | 204—219 |
| 2,848,406 | 8/1958 | Szechtman | 204—219 |
| 2,872,403 | 2/1959 | Honsberg | 204—220 |
| 2,876,182 | 3/1959 | Hopper et al. | 204—99 |
| 3,051,637 | 8/1962 | Judice et al. | 204—99 |
| 3,055,734 | 9/1962 | Pomykala | 204—128 |

FOREIGN PATENTS 994,899    9/1929    Great Britain.

JOHN H. MACK, *Primary Examiner.*

MURRAY TILLMAN, *Examiners.*

L. G. WISE, H. M. FLOURNOY, *Assistant Examiners.*